United States Patent
Samir

(10) Patent No.: US 11,502,572 B2
(45) Date of Patent: Nov. 15, 2022

(54) ELECTRIC MACHINE STATOR

(71) Applicant: FORD GLOBAL TECHNOLOGIES, LLC, Dearborn, MI (US)

(72) Inventor: Aidan Samir, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1073 days.

(21) Appl. No.: 16/155,202

(22) Filed: Oct. 9, 2018

(65) Prior Publication Data

US 2020/0112220 A1    Apr. 9, 2020

(51) Int. Cl.
| | |
|---|---|
| *H02K 3/46* | (2006.01) |
| *H02K 3/50* | (2006.01) |
| *H02K 3/12* | (2006.01) |
| *H02K 1/16* | (2006.01) |

(52) U.S. Cl.
CPC ................. *H02K 3/50* (2013.01); *H02K 1/16* (2013.01); *H02K 3/12* (2013.01); *H02K 2203/06* (2013.01)

(58) Field of Classification Search
CPC .. H02K 3/50; H02K 3/46; H02K 3/28; H02K 3/12; H02K 1/16; H02K 2203/06
See application file for complete search history.

(56) References Cited

U.S. PATENT DOCUMENTS

| | | | |
|---|---|---|---|
| 6,216,513 B1 | 4/2001 | Nakamura et al. | |
| 6,624,544 B2 | 9/2003 | Higashino et al. | |
| 7,511,394 B2 | 3/2009 | Okada et al. | |
| 8,427,024 B2 | 4/2013 | Watanabe et al. | |
| 10,193,409 B2* | 1/2019 | Nakayama | H02K 15/02 |
| 2009/0127948 A1* | 5/2009 | Shimizu | H02K 3/50 |
| | | | 310/71 |
| 2015/0017845 A1* | 1/2015 | Tomita | H01R 4/186 |
| | | | 439/879 |
| 2017/0110929 A1* | 4/2017 | Egami | H02K 5/225 |
| 2018/0123414 A1 | 5/2018 | Kim | |
| 2020/0220436 A1* | 7/2020 | Dunn | H02K 5/225 |
| 2021/0273513 A1* | 9/2021 | Siddiqui | H02K 3/48 |
| 2021/0344243 A1* | 11/2021 | Koga | H02K 15/0081 |

FOREIGN PATENT DOCUMENTS

| | | | | | |
|---|---|---|---|---|---|
| CN | 1251384 | C | * | 4/2006 | ............ H02K 3/50 |
| CN | 101436796 | A | * | 5/2009 | ............ H02K 3/50 |
| CN | 104823364 | A | * | 8/2015 | ............ H02K 3/522 |
| CN | 106602772 | A | * | 4/2017 | ............ H02K 3/50 |
| CN | 107078578 | A | * | 8/2017 | .......... H02K 15/064 |
| CN | 107919776 | A | * | 4/2018 | ............ H02K 5/225 |
| CN | 109075647 | A | * | 12/2018 | .......... H02K 1/2706 |
| CN | 110034627 | A | * | 7/2019 | ............ H02K 3/38 |

(Continued)

*Primary Examiner* — Edgardo San Martin
(74) *Attorney, Agent, or Firm* — David B Kelley; Brooks Kushman P.C.

(57) ABSTRACT

An electric machine stator includes a cylindrical core, windings, a plurality of terminal plates, a plurality of parallel lead wire pairs. The cylindrical core extends axially between a front surface and a back surface. The windings have multiple phases and are disposed radially along the core. Each of the pairs of parallel lead wires extend axially between the front surface and one of the terminal plates. Each of the pairs of parallel lead wires electrically connects one of the terminal plates to one phase of the windings.

20 Claims, 2 Drawing Sheets

(56) References Cited

FOREIGN PATENT DOCUMENTS

| | | | | | |
|---|---|---|---|---|---|
| CN | 111092508 | A | * | 5/2020 | ............. B60K 11/02 |
| CN | 111987879 | A | * | 11/2020 | |
| CN | 112448518 | A | * | 3/2021 | ............... H02K 3/50 |
| CN | 213959835 | U | * | 8/2021 | |
| CN | 113346642 | A | * | 9/2021 | ............... H02K 3/48 |
| EP | 2061133 | A2 | * | 5/2009 | ............... H02K 3/50 |
| EP | 3154162 | A1 | * | 4/2017 | ............. H02K 5/225 |
| EP | 3200324 | A1 | * | 8/2017 | ............... H02K 9/06 |
| JP | 2012110188 | A | * | 6/2012 | ............. H02K 3/522 |
| JP | 2015027159 | A | * | 2/2015 | |
| WO | WO-2020195125 | A1 | * | 10/2020 | ............... H02K 3/50 |

* cited by examiner

ELECTRIC MACHINE STATOR

TECHNICAL FIELD

The present disclosure relates to electric machines, including motors and/or generators.

BACKGROUND

Electric machines, including motors, generators, and combination motor/generators include a stator that houses a rotor. In an electric motor, the stator generates a rotating magnetic field that drives the rotor (i.e., the rotating magnetic field causes the rotor to rotate). In an electric generator, the stator is configured to convert a rotating magnetic field generated by rotation of the rotor in electrical current.

SUMMARY

An electric machine stator includes a cylindrical core, windings, a plurality of terminal plates, a plurality of parallel lead wire pairs. The cylindrical core extends axially between a front surface and a back surface. The windings have multiple phases and are disposed radially along the core. Each of the pairs of parallel lead wires extend axially between the front surface and one of the terminal plates. Each of the pairs of parallel lead wires electrically connects one of the terminal plates to one phase of the windings.

An electric machine stator includes a cylindrical core, windings, terminal plates, and pairs of parallel lead wires. The windings are disposed along the core and have three phases. Each of the terminal plates are configured to connect a power source to the stator. The wires of each of the pairs of parallel lead wires are commonly connected to one of the terminal plates at first wire ends. The wires of each of the pairs of parallel lead wires are commonly connected to one of the phases of the windings at second wire ends.

An electric machine stator includes a winding array and a plurality of lead wire pairs. The winding array is disposed radially along a cylindrical core and has multiple phases. The wires of each of the lead wire pairs are commonly affixed to one of a plurality of terminal plates. The wires of each of the lead wire pairs are commonly connected to one of the phases of the windings.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
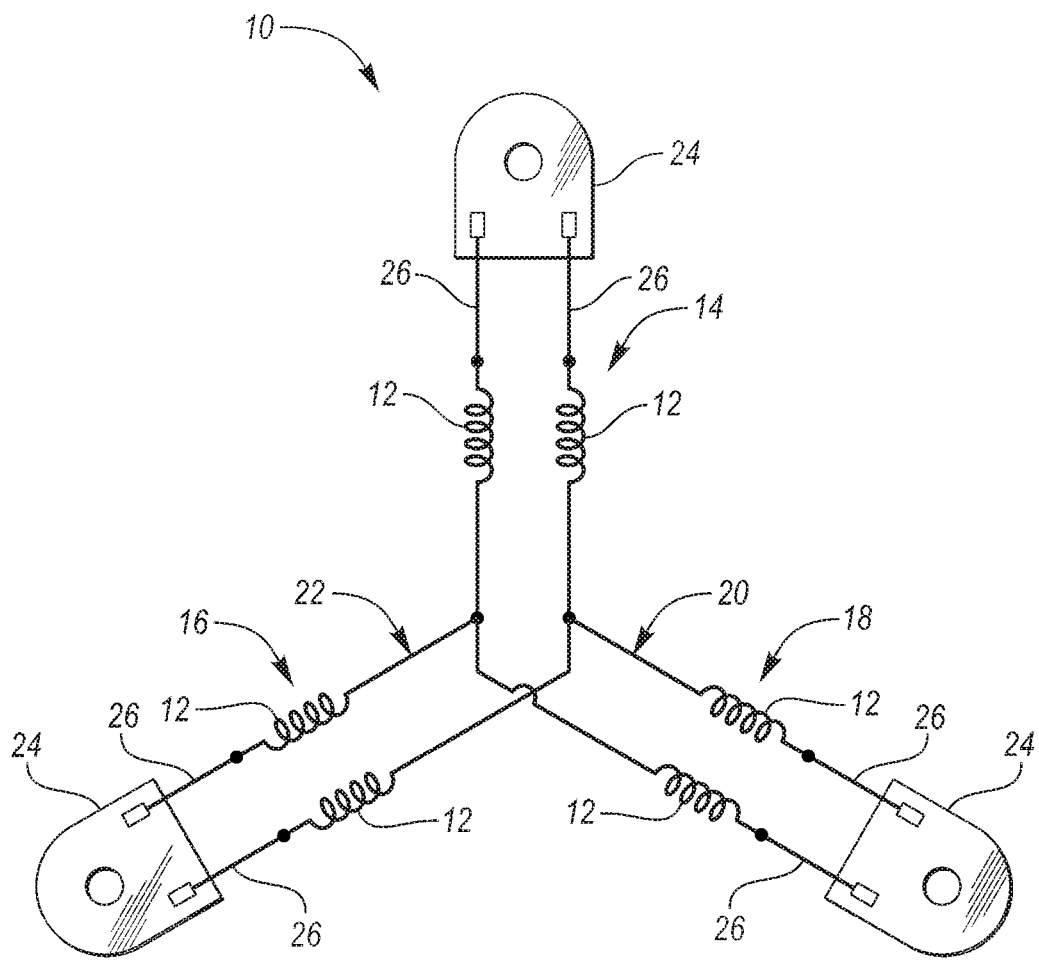
FIG. 1 is a wire diagram of a stator for an electric machine.

Referring to FIG. 1, a wire diagram of a stator 10 for an electric machine is illustrated. The stator 10 includes coils or windings 12 that have multiple phases. In the illustrated embodiment the windings 12 are specifically shown to have a first phase 14, a second phase 16, and a third phase 18. Although three phases are depicted in the illustrated embodiment, it should be understood that the stator 10 may have two or more winding phases. The windings 12 form a first circuit 20 and a second circuit 22. The first circuit 20 and the second circuit 22 are parallel circuits. A pair of windings 12 forms each of the phases of the stator 10 (i.e., the first phase 14, second phase 16, and third phase 18). Each of the pairs of windings 12 that form a single phase of the stator 10 are comprised of one winding from the first circuit 20 and one winding from the second circuit 22. The individual windings 12 that comprise one of the pairs of windings 12 that form a single phase of the stator 10 are parallel relative to each other.

The stator 10 includes a plurality of terminal plates 24. Each of the terminal plates 24 may be configured to connect one of the phases of the stator 10 (i.e., the first phase 14, second phase 16, and third phase 18) to one phase of a power source that has an alternating electric current. For example, the terminal plates 24 may be connected to a battery via an inverter circuit, which converts the direct electric current produced by the battery into alternating electric current, which is then delivered to the stator 10 to operate the electric machine as an electric motor.

It should also be noted that the electric machine may be operated as a generator that produces alternating electric current. Each of the terminal plates 24 may connect each phase of the stator 10 to a separate device to operate the separate device on the alternating current. Alternatively, each of the terminal plates 24 may connect each phase of the stator 10 to an inverter which then converts the alternating electric current being generated by the electric machine into direct electric current. The direct electric current may be utilized to operate a separate device or to recharge a battery.

Electric machines that operate as both a motor and as a generator are often utilized in hybrid and electric vehicles. For example, an electric machine in a hybrid or electric vehicle may operate as a generator in order to convert rotational energy into electrical energy to be stored in a vehicle battery or may operate as a motor in order to provide power and torque to wheels of the electric or hybrid vehicle.

In a hybrid vehicle an engine and an electric machine may both be drive sources for the vehicle that are each configured to propel the vehicle. The engine generally represents a power source that may include an internal combustion engine such as a gasoline, diesel, or natural gas powered engine, or a fuel cell. The engine generates an engine power and corresponding engine torque that is supplied to the drive wheels of the vehicle. The electric machine may be implemented by any one of a plurality of types of electric machines. Power electronics may be utilized to condition direct current (DC) power provided by a battery to the requirements of the electric machine. For example, power electronics may provide three phase alternating current (AC) to the electric machine.

In any mode of operation, the electric machine may act as a motor and provide a driving force for the powertrain of the vehicle. Alternatively, the electric machine may act as a generator and convert kinetic energy from the powertrain of the vehicle into electric energy to be stored in the battery of the vehicle. The electric machine may act as a generator while the engine is providing propulsion power for the vehicle, for example. The electric machine may additionally act as a generator during times of regenerative braking in which torque and rotational (or motive) energy or power from spinning wheels is transferred back through the powertrain of the vehicle and is converted into electrical energy for storage in the battery of the vehicle.

The electric machine may be utilized in any type of hybrid or electric vehicle that utilizes an electric machine. Other hybrid and electric vehicle configurations should be construed as disclosed herein. Other hybrid vehicle configurations may include, but are not limited to series hybrid vehicles, parallel hybrid vehicles, series-parallel hybrid vehicles, plug-in hybrid electric vehicles (PHEVs), fuel cell hybrid vehicles, battery electric vehicles (BEVs) or any other hybrid vehicle configuration known to a person of ordinary skill in the art.

Each of the pairs of windings 12 that form a single phase of the stator 10 (i.e., the first phase 14, second phase 16, and third phase 18) are connected to one of the terminal plates 24. More specifically, the windings 12 that form one of the pairs of windings 12 are secured to one of terminal plates 24 in parallel. A plurality of lead wires 26 connect the windings 12 to the terminal plates 24. More specifically, one of a plurality of parallel lead wire pairs 26 connect each of the pairs of parallel windings 12 that form a single phase of the stator 10 (i.e., the first phase 14, second phase 16, and third phase 18) to one of the terminal plates 24 in parallel.

Figure 2:
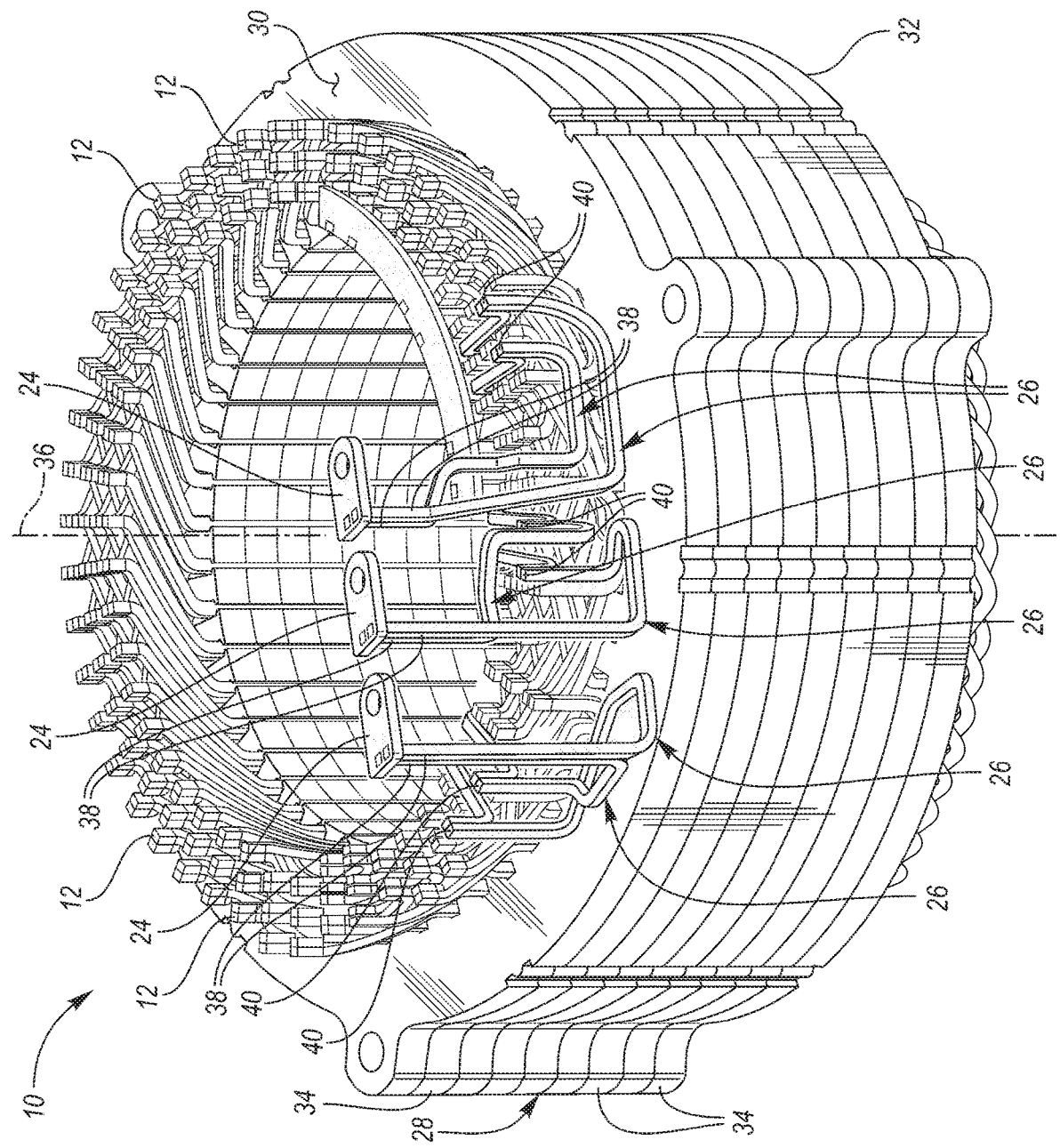
FIG. 2 is a perspective view of the stator.

Referring to FIG. 2, a perspective view of the stator 10 is illustrated. The stator 10 includes a cylindrical core 28 that extends axially between a front surface 30 and a back surface 32. The core 28 is comprised of a plurality of laminate plates 34 that are sequentially stacked in an axial direction along an axis of rotation 36 of the electric machine. The windings 12 form an array that is disposed radially along the cylindrical core 28.

Each of the pairs of lead wires 26 extend axially between the front surface 30 of the cylindrical core 28 and one of the terminal plates 24 to electrically connect one of the terminal plates 24 to one phase of the windings 12. More specifically, each lead wire 26 of one of the pairs of lead wires 26 are commonly connected to one of the terminal plates 24 at first wire ends 38, and are commonly connected to one of the phases of the windings 12 (i.e., are connected to the pairs of parallel windings 12 that form a single phase of the stator 10) at second wire ends 40. The lead wires may be connected to one of the terminal plates 24 at first wire ends 38 and to one of the phases of the windings 12 at the second wire ends 40 via a welding process. The lead wires 26 may be rigidly formed to secure the positions of the terminal plates 24 relative to the cylindrical core 28. The lead wires 26 may have cross-sectional areas that are round, square, rectangular, or any other desirable shape.

Figure 3:
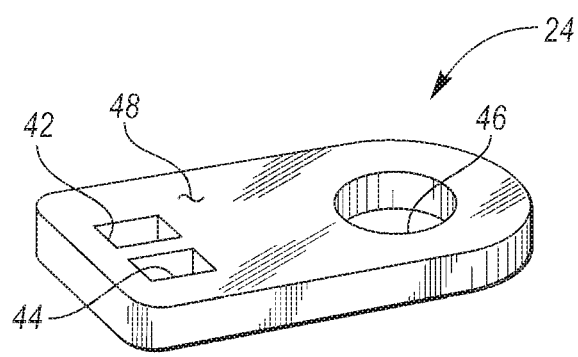
FIG. 3 is perspective view of an electrical terminal that is utilized to connect one of the phases of the stator to an external device or a power source.

Referring to FIG. 3, a perspective view of one of the electrical terminal plates 24 that is utilized to connect one of the phases (i.e., the first phase 14, second phase 16, and third phase 18) of the stator 10 to an external device or an external power source is illustrated. The terminal plate 24 illustrated in FIG. 3 is representative of all of the terminal plates 24 depicted in FIGS. 1 and 2. Each of the terminal plates 24 defines a first orifice 42 and a second orifice 44.

A first end 38 of a first of the lead wires 26 and first end 38 of a second of the lead wires 26 of each of the pairs of lead wires 26 are disposed within the first orifice 42 and within the second orifice 44 of one of the terminal plates 24, respectively, which is shown in FIG. 2. More specifically, the first end 38 of the first of the lead wires 26 and the first end 38 of the second of the lead wires 26 of each of the pairs of lead wires 26 may be welded to one of the terminal plates 24 within the first orifice 42 and within the second orifice 44, respectively.

The lead wires 26 may be welded to the terminal plates 24 and within the orifices 42, 44 via spot welding, via laser welding, or any other welding process. Laser welding is capable of welding components of a device together within a small area without requiring significant clearance for tooling. Therefore, it may be advantageous to utilize laser welding to secure the first ends 38 of the lead wires 26 to each of the terminal plates 24.

Each of the terminal plates 24 also defines a third office 46 that is configured to receive an electrical connection from a separate device or a power source. More specifically, the third orifice of each terminal plate 24 may be configured to receive a wire that is connected to one phase of a power source that generates alternating current. For example, the terminal plates 24 may be connected to a wire that extends from an inverter circuit, which is in is turn connected to a battery, where the inverter circuit converts the direct electric current produced by the battery into alternating electric current, which is then delivered to the stator 10 to operate the electric machine as an electric motor.

The terminal plates 24 may have flat external surfaces 48 that are parallel with the front surface 30 of the cylindrical core 28 of the stator 10. The flat external surfaces 48 may be configured to mate with electrical connections from a separate device or a power source. For example, a separate device or power source may include a wire that has an electrical connection that is also flat in shape where the electrical connection of the separate device or power source also defines an orifice. A fastener may extend through the third office 46 in one of the terminal plates 24 and through the orifice of the electrical connection of the separate device or power source in order to force the flat external surface 48 of the terminal plate 24 into contact with the electrical connection of the separate device or power source.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine stator comprising:
   a cylindrical core extending axially between a front surface and a back surface;
   windings having multiple phases and disposed radially along the core;
   a plurality of terminal plates, each (i) having opposing surfaces that are parallel to each other and the front surface, and (ii) defining first, second, and third orifices extending axially relative to the core, through the terminal plates, and between the opposing surfaces; and
   a plurality of parallel lead wire pairs, each of the pairs extending axially relative to the core (i) from the front surface, (ii) to one of the terminal plates, and (iii) through one of the first or second orifices, wherein the plurality of lead wire are electrically connecting one of the terminal plates to one phase of the windings.

2. The stator of claim 1, wherein first ends of the wires of each of the pairs are commonly connected to one of the terminal plates, and wherein second ends of the wires of each of the pairs are commonly connected to one of the phases of the windings.

3. The stator of claim 2, wherein the first ends of the wires of each of the pairs are disposed within the first and second orifices of one of the terminal plates.

4. The stator of claim 3, wherein the first ends of the wires of each of the pairs are welded to one of the terminal plates within the first and second orifices.

5. The stator of claim 3, wherein the third office is configured to receive an electrical connection from a power source.

6. The stator of claim 1, wherein one of the opposing surfaces of each terminal plate is configured to mate with electrical connections from a power source.

7. The stator of claim 1, wherein each phase has a pair of parallel windings.

8. An electric machine stator comprising:
   a cylindrical core defining an axis of rotation of the electric machine;
   windings disposed along the core and having three phases;
   terminal plates, each (i) having opposing surfaces that are parallel to each other and perpendicular to the axis of rotation, (ii) defining first, second, and third orifices extending parallel to the axis, through the terminal plates, and between the opposing surfaces, and (iii) configured to connect a power source to the stator; and
   pairs of parallel lead wires extending in a direction that is parallel to the axis of rotation (i) from the cylindrical core, (ii) to one of the terminal plates, and (iii) through one of the first or second orifices, wherein the wires of each of the pairs are commonly connected to one of the terminal plates at first wire ends, and commonly connected to one of the phases of the windings at second wire ends.

9. The stator of claim 8, wherein the wires of each of the pairs are disposed within the first and second orifices of one of the terminal plates.

10. The stator of claim 9, wherein the wires of each pairs are welded to one of the terminal plates within the first and second orifices.

11. The stator of claim 9, wherein the third office is configured to receive an electrical connection from a power source.

12. The stator of claim 8, wherein the core extends axially between a front surface and a back surface.

13. The stator of claim 12, wherein the opposing surfaces are parallel with the front surface and one of the opposing surfaces of each terminal plate is configured to mate with electrical connections from a power source.

14. An electric machine stator comprising:
    a winding array disposed radially along a cylindrical core and having multiple phases, wherein the cylindrical core defines an axis of rotation of the electric machine; and
    a plurality of lead wire pairs, the wires of each of the pairs commonly affixed to one of a plurality of terminal plates, and commonly connected to one of the phases of the windings, wherein each terminal plate (i) has opposing surfaces that are parallel to each other and perpendicular to the axis of rotation, and (ii) defines first, second, and third orifices extending parallel to the axis, through the terminal plate, and between the opposing surfaces, and wherein each lead wire extends in a direction that is parallel to the axis of rotation (i) from the cylindrical core, (ii) to one of the terminal plates, and (iii) through one of the first or second orifices.

15. The stator of claim 14, wherein the core extends axially between a front surface and a back surface.

16. The stator of claim 15, wherein the opposing surfaces are parallel with the front surface and one of the opposing surfaces of each terminal plate is configured to mate with electrical connections from a power source.

17. The stator of claim 14, wherein the wires of each of the pairs are disposed within the first and second orifices of one of the terminal plates.

18. The stator of claim 17, wherein the wires of each of the pairs are welded to one of the terminal plates within the first and second orifices.

19. The stator of claim 17, wherein the third office is configured to receive an electrical connection from a power source.

20. The stator of claim 14, wherein the array of windings have three phases, and wherein each phase has a pair of parallel windings.

* * * * *